United States Patent
Westphal

(10) Patent No.: US 8,732,214 B2
(45) Date of Patent: May 20, 2014

(54) PRODUCT SEARCH

(75) Inventor: Geoffry A. Westphal, Evanston, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 305 days.

(21) Appl. No.: 13/347,363

(22) Filed: Jan. 10, 2012

(65) Prior Publication Data

US 2013/0179468 A1    Jul. 11, 2013

(51) Int. Cl.
*G06F 17/30* (2006.01)
(52) U.S. Cl.
USPC ........... 707/813; 707/608; 707/609; 707/687; 707/790; 707/705
(58) Field of Classification Search
USPC .................. 707/308, 609, 687, 790, 813
See application file for complete search history.

(56) References Cited

U.S. PATENT DOCUMENTS

| | | | |
|---|---|---|---|
| 2003/0061238 A1* | 3/2003 | Atkinson | 707/104.1 |
| 2007/0061303 A1* | 3/2007 | Ramer et al. | 707/3 |
| 2008/0120129 A1* | 5/2008 | Seubert et al. | 705/1 |
| 2010/0121705 A1* | 5/2010 | Ramer et al. | 705/14.46 |

* cited by examiner

*Primary Examiner* — Sana Al Hashemi
(74) *Attorney, Agent, or Firm* — Greenberg Traurig, LLP

(57) ABSTRACT

A system and method for searching a product model number database having a plurality of product model numbers stored therein receives a string to be searched in the product model number database from a client device. Multiple queries are then created based on the string and the model number database is queried using the created queries. Query results responsive to the created queries are then received from the model number database and transmitted to the client device.

19 Claims, 13 Drawing Sheets

FIG. 13

| Model # | Brand | Desc | Avail. | Alt. | Price |
|---|---|---|---|---|---|
| 1032 | Hoover | Vacuum Cleaner | 5 | | $120.00 |
| 103247 | Estwing | Ball Pein Hammer | 3 | | $ 14.55 |
| 10325A | Milwaukee | 1/4" Drill | 0 | 3D543 | $123.95 |

PRODUCT SEARCH

BACKGROUND

Product manufacturers and distributors typically assign model numbers to products. However, each manufacturer and distributor typically has its own format or standards for its model numbers. For example, some model numbers are strictly numeric, while others alpha-numeric or even pure alphabetic. Oftentimes hyphens or slashes in the number separate meaningful designations, like facility location, product run number, product revision, etc. Different products or product families may have different formats altogether. Still further, not all catalog numbers from a given distributor are the same length. Sometimes model numbers are prefixed, with the prefix having a meaning about that product (e.g., corresponding to particular characteristic). Other times model numbers have suffixes for the same purpose.

These variations amongst product model numbers can cause problems when searching for a particular model number in a database. For example, one challenge in searching for model numbers is that the prefixes and suffixes are not always carried along with the base model number throughout the supply chain. Some prefixes are used for tracking marketing effectiveness of various fliers and catalogs and are subsequently dropped when the model number shows up on an invoice or packing slip.

In other instances, suffixes may be added by the manufacturer to track minor variations in a product. Distributors typically do not have the ability to update paper catalogs and/or fliers with this suffix during the year, so the typical protocol is to not append it. However, the manufacturer will print the model number with the suffix on the packaging that is received by the customers.

Further, some all-numeric model numbers may carry a leading zero. This can create problems when these numbers are entered into certain spreadsheets, because the default action of such spreadsheets is to drop the leading zero. As a result, customers who use the model number in the spreadsheet as input to a vendor's search engine may not find a match.

Thus, customers do not always experience consistency in model numbers, even across the same product. This can cause difficulty when searching for model numbers on an e-commerce site, because the model numbers the customer has do not always match the model numbers in the vendor's model number database.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The following generally describes systems and methods for searching a product model number database having a plurality of product model numbers stored therein. More particularly, systems and methods are described that receive a string to be searched in the product model number database from a client device. Multiple queries are then created based on the string, and the model number database is queried using the created queries. Query results responsive to the created queries are then received from the model number database and transmitted to the client device.

Additionally, any of the queries may be selected from the group consisting of: a search for product model numbers that exactly match the search string; a search for product model numbers beginning with the string; a search for product model numbers ending with the string; a search for product model numbers containing the string; or a search for product model numbers beginning with one or more leading zeroes followed by the string. One of the queries may also include a partial match query, in which characters are iteratively subtracted from the beginning and/or end of the search string to create one or more modified search strings, and the modified search strings are substituted into one or more of the other aforementioned queries. Further, the system and method may successively receive each character of the string, and recreate and resubmit the queries each time a character is received.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 13 illustrates a seventh screen of an example user interface of an embodiment.

DETAILED DESCRIPTION

Figure 1:
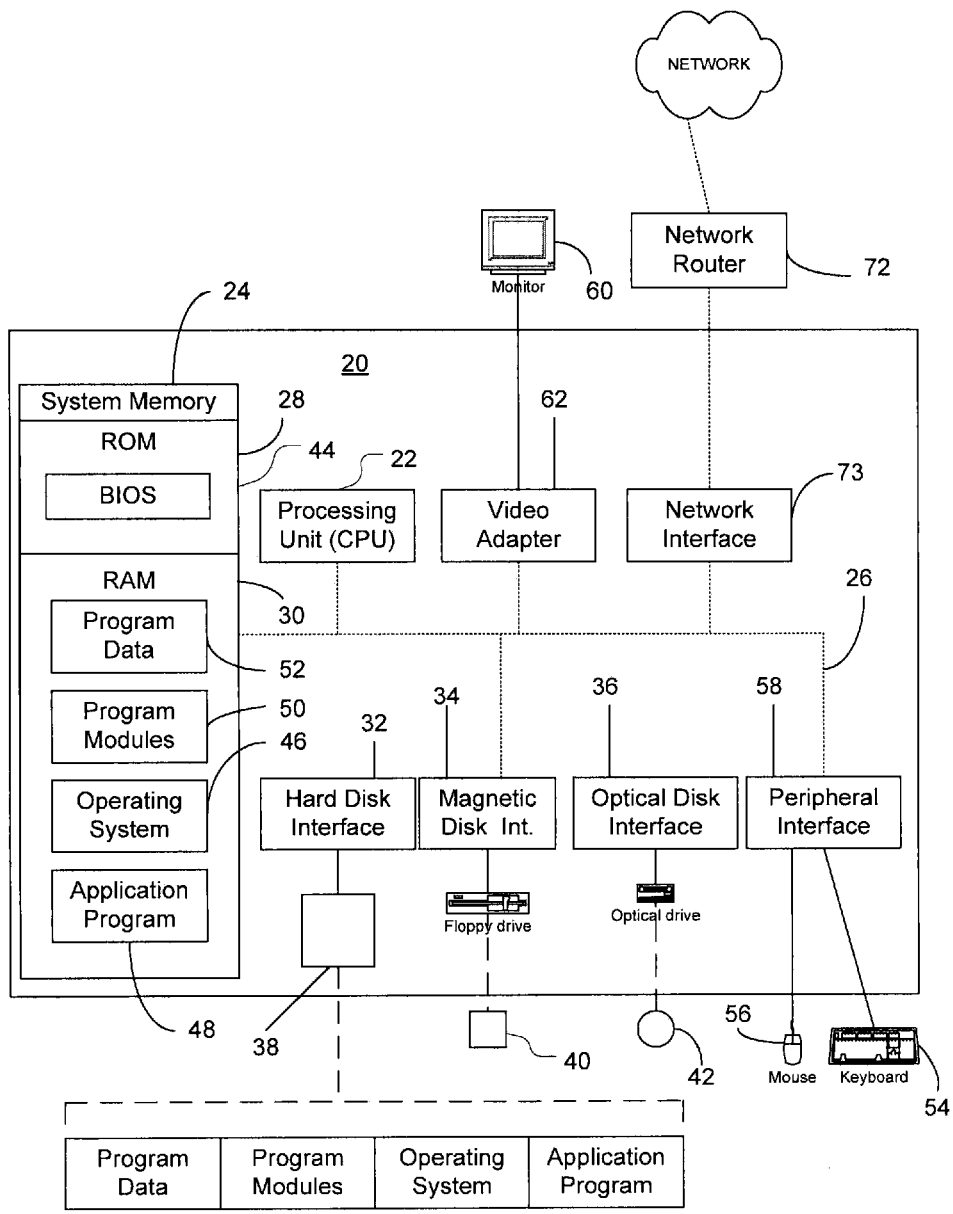
FIG. 1 illustrates an exemplary operating environment for implementing embodiments.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

With reference to the figures, systems and methods are hereinafter described for searching a product model number database and providing search results. While not intended to be limiting, the system and method will be described in the context of a plurality of processing devices linked via a network, such as a local area network or a wide area network, as illustrated in FIG. 1. In this regard, a processing device 20, illustrated in the exemplary form of a device having conventional computer components, is provided with executable instructions to, for example, provide a means for a user to access a remote processing device, such as a client, server, database, etc., via the network to, among other things, perform a search of a product model number database. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant ("PDA"), cellular or smart telephone, tablet computer, or the like. Furthermore, while described and illustrated in the context of a single processing device 20, those skilled in the art will also appreciate that the various tasks described hereinafter may be practiced in a distributed or cloud-like environment having multiple processing devices linked via a local or wide-area network whereby the executable instructions may be associated with and/or executed by one or more processing devices.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated non-transient, computer-readable media allow for the nonvolatile storage of computer readable instructions, data structures, program modules and other data for the processing device 20. Those skilled in the art will further appreciate that other types of non-transient, computer readable media that can store data may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser, camera, picture editor, etc.), other program modules 50, and/or program data 52. Still further, computer-executable instructions may be downloaded to one or more of the computing devices as needed, for example, via a network connection.

A user may interact with the various application programs 48, etc. of the processing device, e.g., to enter commands and information into the processing device 20, through input devices such as a touch screen, keyboard 54 and/or a pointing device 56. While not illustrated, other input devices may include a microphone, a joystick, a game pad, a scanner, a camera, a gesture recognizing device, etc. These and other input devices would typically be connected to the processing unit 22 by means of an interface 58 which, in turn, would be coupled to the bus 26. Input devices may be connected to the processor 22 using interfaces such as, for example, a parallel port, game port, IEEE 1394, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

The processing device 20 may also utilize logical connections to one or more remote processing devices. Communications between the processing device 20 and the remote processing devices may be exchanged via a further processing device, such as a network router 72 that is responsible for network routing. Communications with the network router 72 may be performed via a network interface component 73.

Figure 2:
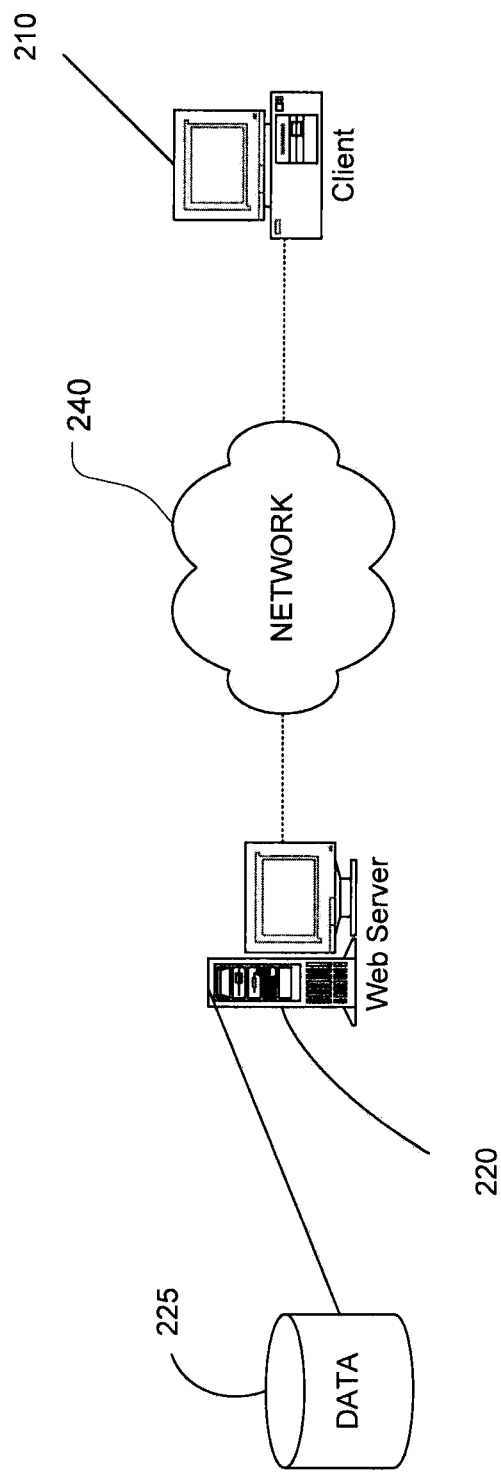
FIG. 2 illustrates a system for conducting a product model number search, in accordance with various embodiments of the present invention.

FIG. 2 illustrates a system 200 for conducting a product model number search, in accordance with various embodiments of the present invention. As illustrated, system 200 includes a client device 210 connected to a server system 220 via a local or wide area network 240. While only a single client 210 and server system 220 are depicted in FIG. 2 for the purposes of simplicity, it will be appreciated that system 200 may include multiple client devices 210 and/or multiple server systems 220. The server system 220 includes one or more associated data repositories 225, e.g., storing a database of product information, etc. In this regard, while the server system 220 has been illustrated in the exemplary form of a computer, it will be appreciated that the server system 200 may, like processing device 20, be any type of device having processing capabilities. Again, it will be appreciated that the server system 220 need not be implemented as a single device but may be implemented in a manner such that the tasks performed by the server system 220 are distributed to a plurality of processing devices linked through a communication network, e.g., implemented in the cloud. Additionally, the server system 220 may have logical connections to other third party server systems via the network as needed and, via such connections, will be associated with data repositories that are associated with such other third party server systems.

For performing tasks, the server system 220 may include many or all of the elements described above relative to the processing device 20. By way of further example, the server system 220 includes executable instructions stored on a non-transient memory device for, among other things, handling search requests, providing search results, etc. Thus, within a networked environment, e.g., the Internet, World Wide Web, LAN, or other similar type of wired or wireless network, it will be appreciated that program modules depicted relative to the processing device 20, or portions thereof, may be stored in the memory storage device(s) of the server system 220.

In accordance with various embodiments, a user of a client device 210 may access product database 225 via a web-based interface provided by server system 220. The interface may be any of a number of known web-based interfaces, including but not limited to HTML, Java and Flash. FIGS. 3-8 illustrate various screens of an example user interface, in accordance with an embodiment. In the illustrated embodiment, the user interface includes a search field 310 for enabling a user to input a search string and an area for displaying search results 320. While the illustrated embodiment shows a text input, it should be appreciated that other forms of input, such as voice input, are also contemplated. The search results 320 of the illustrated embodiment are separated based on the particular query to which they are responsive. In particular, the illustrated embodiment shows separate search results for: a result 321 that is an exact match to the search string; results 322 that start with the start with the search string; search results 323 that contain the search string; search results 324 that end with the search string; and search results 325 that begin with the search string preceded by one or more leading zeros. It should be appreciated that the foregoing queries are merely illustrative, and various other types of queries are contemplated.

In the depicted user interface, searches may be submitted and search results returned in a variety of ways. For example, in one embodiment, the search is submitted and results returned only upon a user clicking the "Search" button 314, pressing an "Enter" key on a user's keyboard, or the like. In another embodiment, the search results 320 are dynamically updated each time the user enters a new character into the text box 312.

Figure 3:
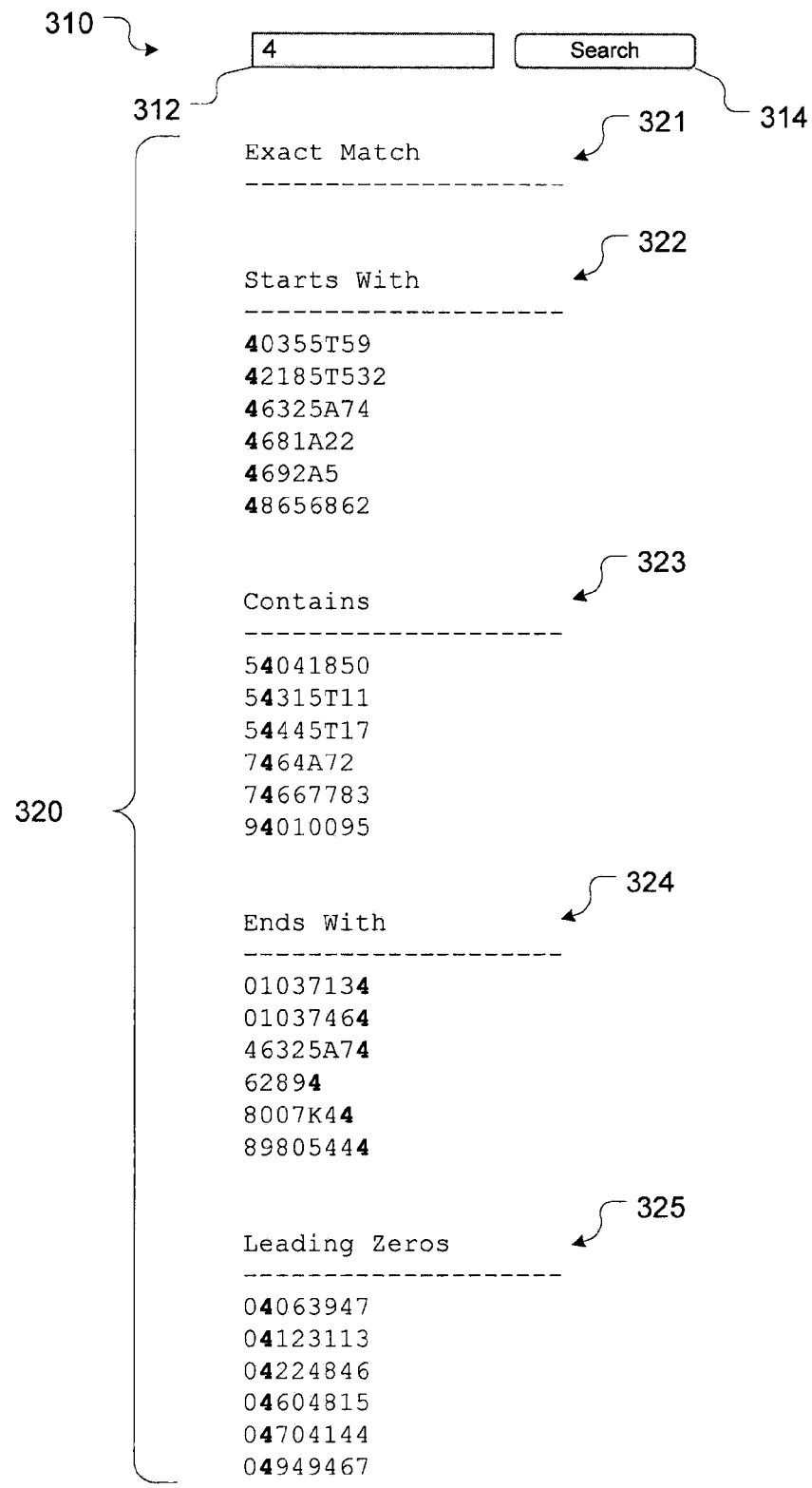
FIG. 3 illustrates a first screen of an example user interface of an embodiment.

In FIG. 3, a user has entered "4" into the text box 312. Upon submission of the search (i.e. either dynamically or upon manual actuation by the user), server system 220 creates multiple queries based on the text string "4" and queries the product number database based thereon. As shown, the server system 220 has found no exact matches 321 of products with the model number "4"; at least six model numbers 322 that start with "4"; at least six model numbers 323 that contain "4"; at least six model numbers 324 that end with "4"; and at least six model numbers 325 that begin with "4" preceded by leading zeros. (For illustrative purposes, only six product numbers have been shown under search results 322-325, but it should be appreciated that more results may be displayed.)

Figure 4:
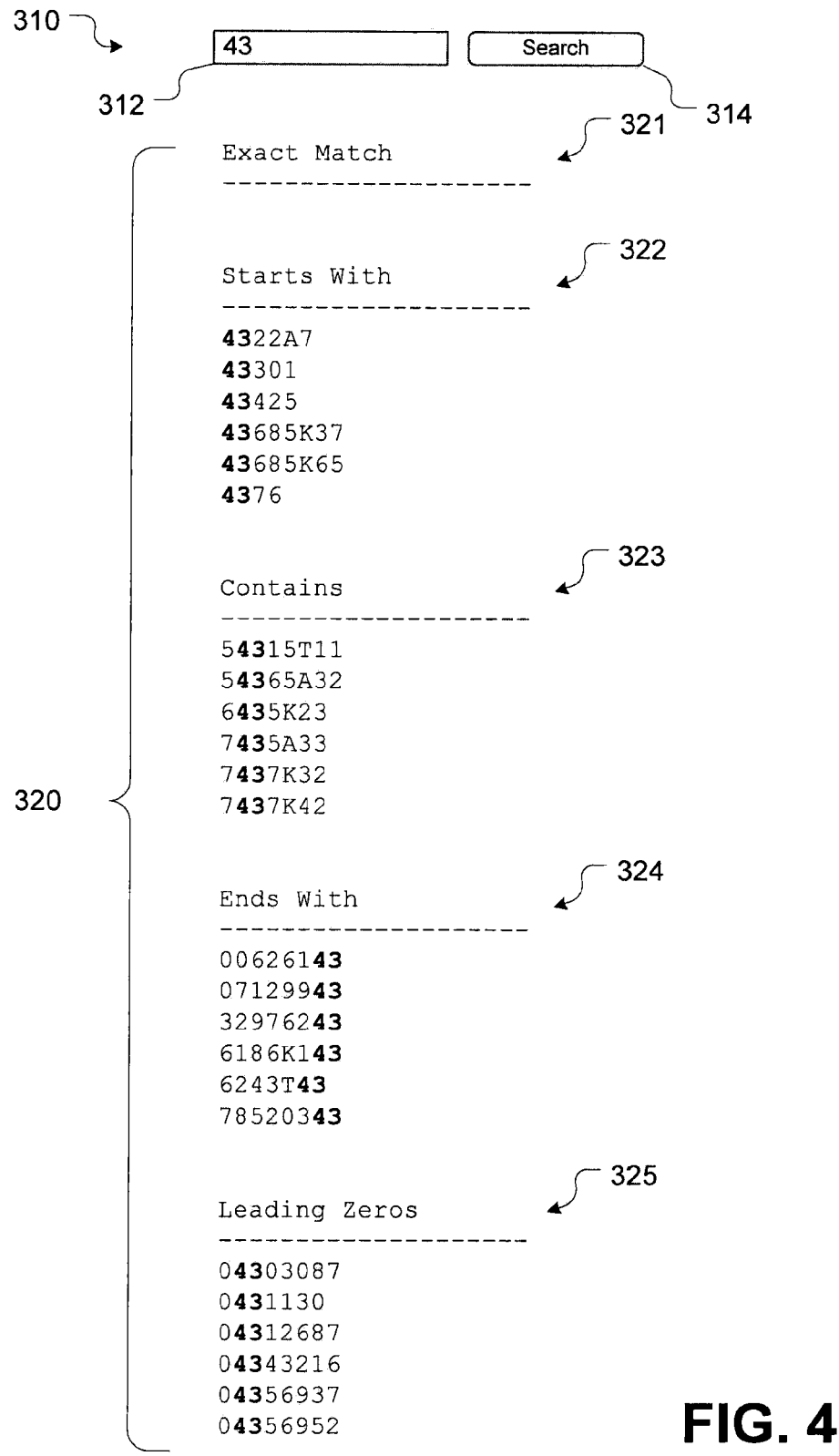
FIG. 4 illustrates a second screen of an example user interface of an embodiment.

In FIG. 4, a user has entered "43" into the text box 312. Upon submission of the search, server system 220 creates multiple queries based on the text string "43" and queries the product number database based thereon. As shown, the server system 220 has found no exact matches 321 of products with the model number "43"; at least six model numbers 322 that start with "43"; at least six model numbers 323 that contain "43"; at least six model numbers 324 that end with "43"; and at least six model numbers 325 that begin with "43" preceded by leading zeros.

Figure 5:
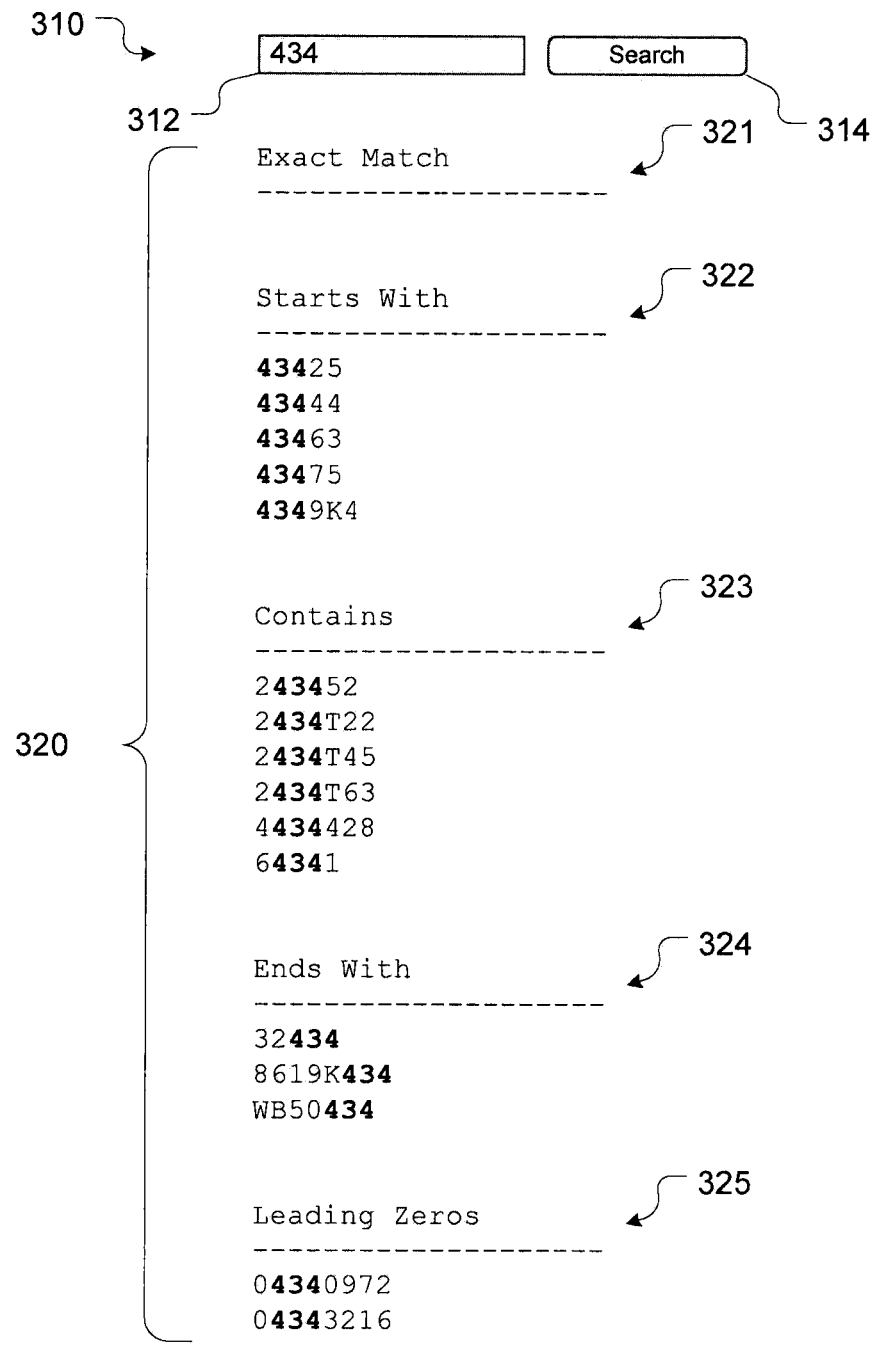
FIG. 5 illustrates a third screen of an example user interface of an embodiment.

In FIG. 5, a user has entered "434" into the text box 312. Upon submission of the search, server system 220 creates multiple queries based on the text string "434" and queries the product number database based thereon. As shown, the server system 220 has found no exact matches 321 of products with the model number "434"; five model numbers 322 that start with "434"; at least six model numbers 323 that contain "434"; three model numbers 324 that end with "434"; and two model numbers 325 that begin with "434" preceded by leading zeros.

Figure 6:
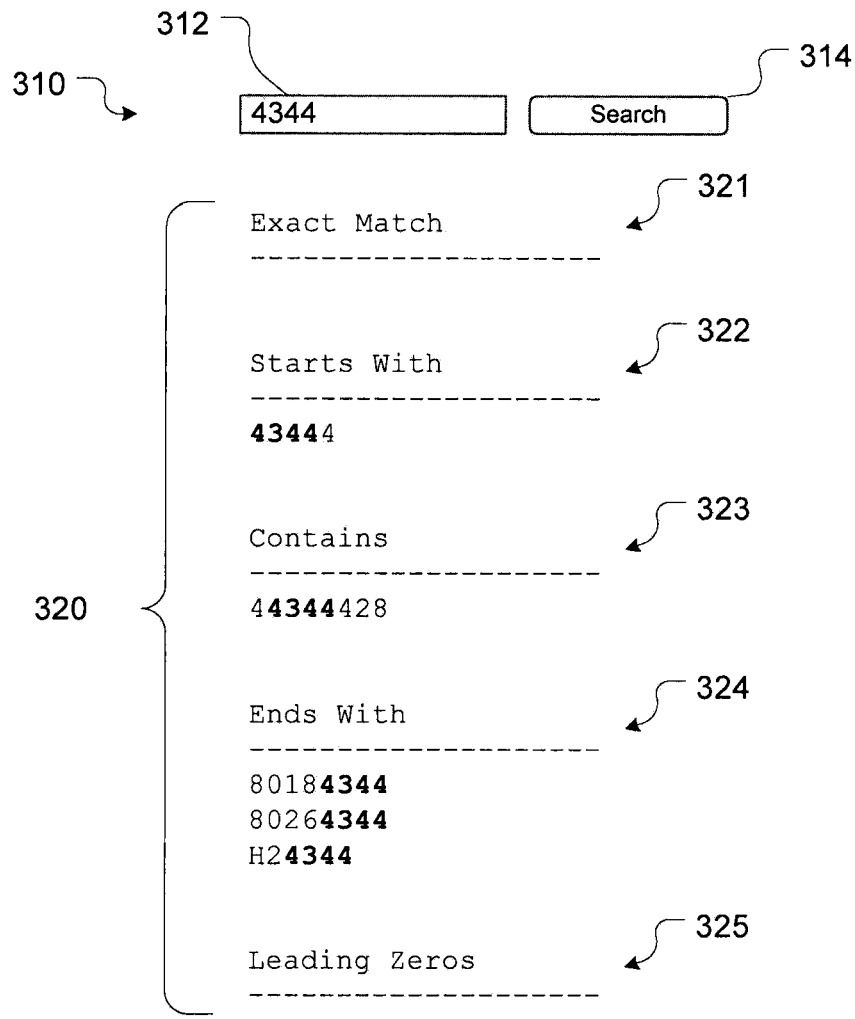
FIG. 6 illustrates a fourth screen of an example user interface of an embodiment.

In FIG. 6, a user has entered "4344" into the text box 312. Upon submission of the search, server system 220 creates multiple queries based on the text string "4344" and queries the product number database based thereon. As shown, the server system 220 has found no exact matches 321 of products with the model number "4344"; one model number 322 that starts with "4344"; one model number 323 that contains "4344"; three model numbers 324 that end with "4344"; and no model numbers 325 that begin with "4344" preceded by leading zeros.

Figure 7:
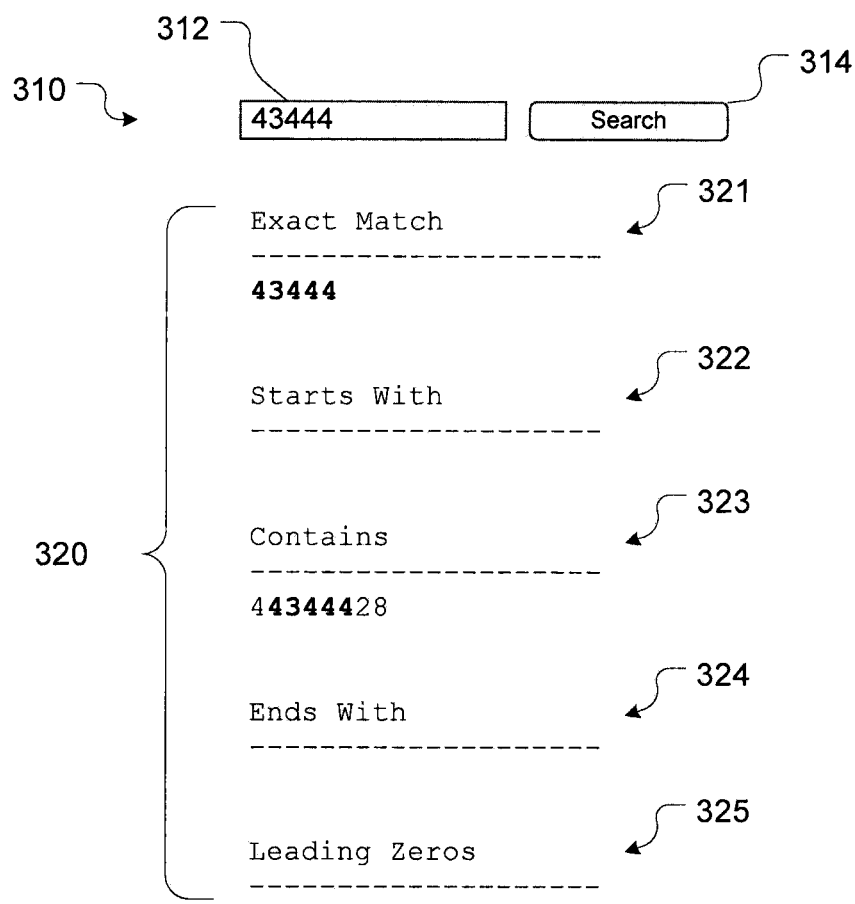
FIG. 7 illustrates a fifth screen of an example user interface of an embodiment.

In FIG. 7, a user has entered "43444" into the text box 312. Upon submission of the search, server system 220 creates multiple queries based on the text string "43444" and queries the product number database based thereon. As shown, the server system 220 has a match 321 of a product with the exact model number "43444"; no model numbers 322 that start with "43444"; one model number 323 that contains "43444"; no model numbers 324 that end with "43444"; and no model numbers 325 that begin with "43444" preceded by leading zeros.

Figure 8:
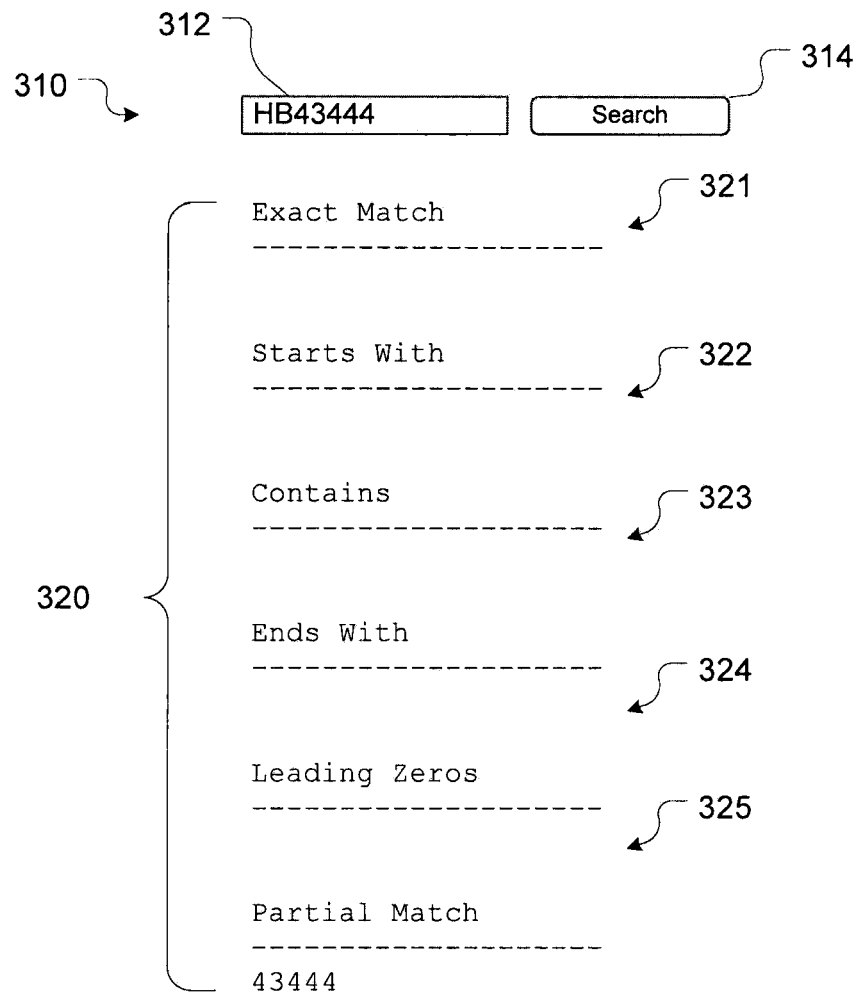
FIG. 8 illustrates a sixth screen of an example user interface of an embodiment.

In some cases, the vendor's database may not have certain prefix and/or suffix information for product model numbers. For example, a vendor database (such as database 225) may associate with a particular product the model number "43444," whereas the fully qualified model number may also include the prefix "HB." In such a case, however, a user may enter the fully qualified model number "HB43444," i.e. with the prefix. In one embodiment, server system 220 may incrementally subtract characters from either end of the user's input to perform additional queries. These queries may be formed successively and conditionally such that, for example, if a result is found after subtracting a single character from the search string, additional queries (e.g. subtracting two characters from the search string) are not performed. As shown in FIG. 8, the user's search for "HB43444" did not return any results 321-325 responsive to the usual queries, so server system 220 conducted an additional, "partial match" query and returned "43444" as a result 326. It should be appreciated that the same technique can be used for suffixes that users enter when the database 225 does not have the suffix.

While FIGS. 3-8 show the displayed search results broken down based upon the particular query to which they are responsive, it will be appreciated that other manners of presenting the search results are possible. For example, as shown in FIG. 13, the results may be displayed in a simple list, with some additional contextual information, such as the brand, description, available quantities, alternate model numbers, price, image, etc. of the matching products. Moreover, as the user types his or her search string, server system 220 may predict and suggest additional characters to the user, e.g. based upon product popularity. This is illustrated by the grayed text in text box 312 of FIG. 13.

The following discussion sets forth in detail the operation of present technology for searching a product model number database. With reference to FIGS. 9-12, flowcharts 900, 1000, 920A and 970A each illustrate example steps used by various embodiments of the present technology for a product model number search system 200. Flowcharts 900, 1000, 920A and 970A include processes that, in various embodiments, are carried out by a processor under the control of non-transient, computer-readable and computer-executable instructions. The computer-readable and computer-executable instructions may reside, for example, in data storage features such as storage devices 24, 38, 40 and/or 42 of FIG. 1. Although specific operations are disclosed in flowcharts 900, 1000, 920A and 970A, such operations are examples. That is, embodiments are well suited to performing various other operations or variations of the operations recited in flowcharts 900, 1000, 920A and 970A. It is appreciated that the operations in flowcharts 900, 1000, 920A and 970A may be performed in an order different than presented, including in parallel, and that not all of the operations in flowcharts 900, 1000, 920A and 970A may be performed. Where helpful for the purposes of illustration and not for limitation, FIGS. 9-12 will be described with reference to FIGS. 1 and 2, which illustrate a hypothetical situation in which embodiments may be implemented.

Figure 9:
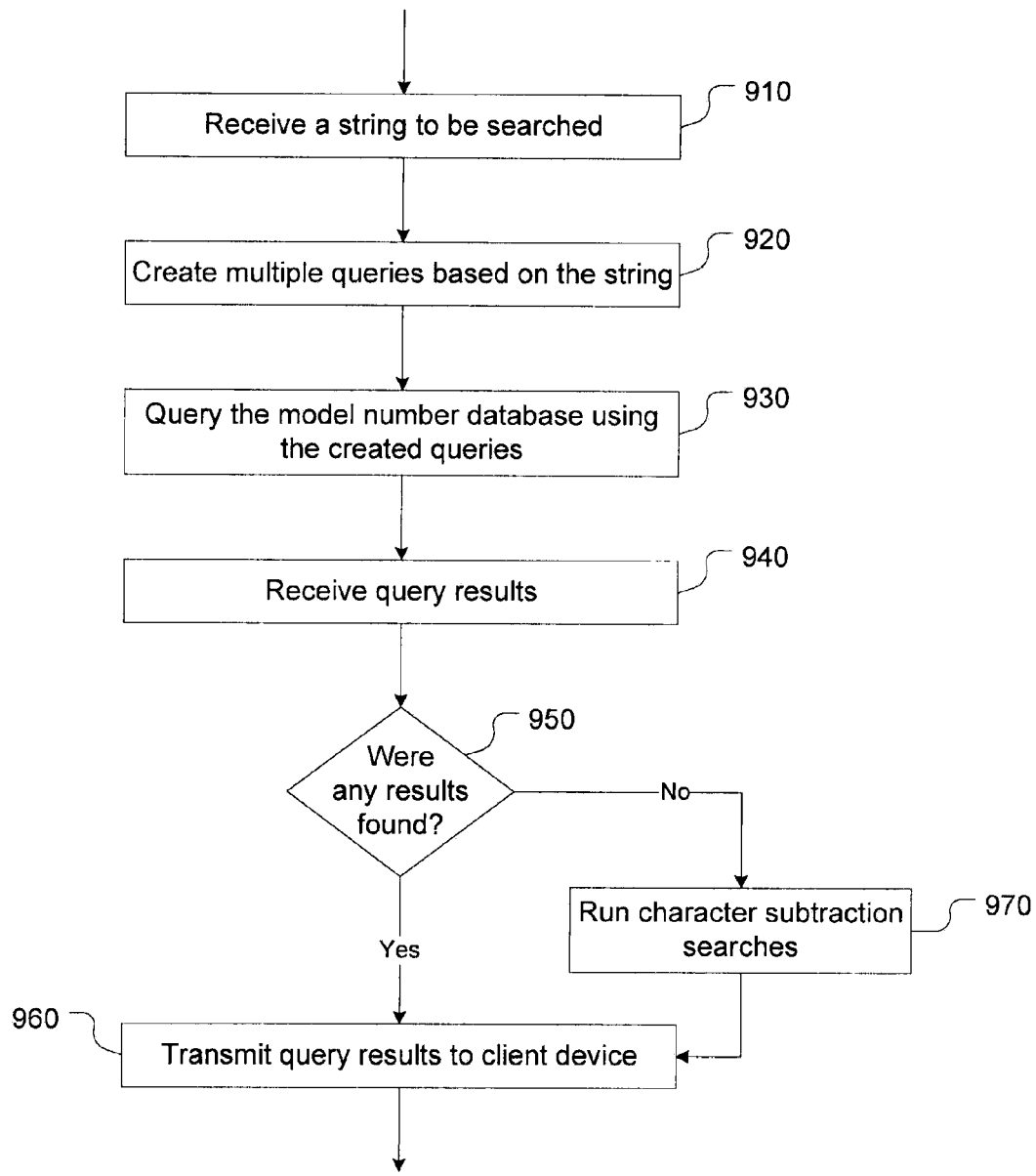
FIG. 9 illustrates a flowchart of a processes for searching a product model number database, in accordance with an embodiment.
Figure 10:
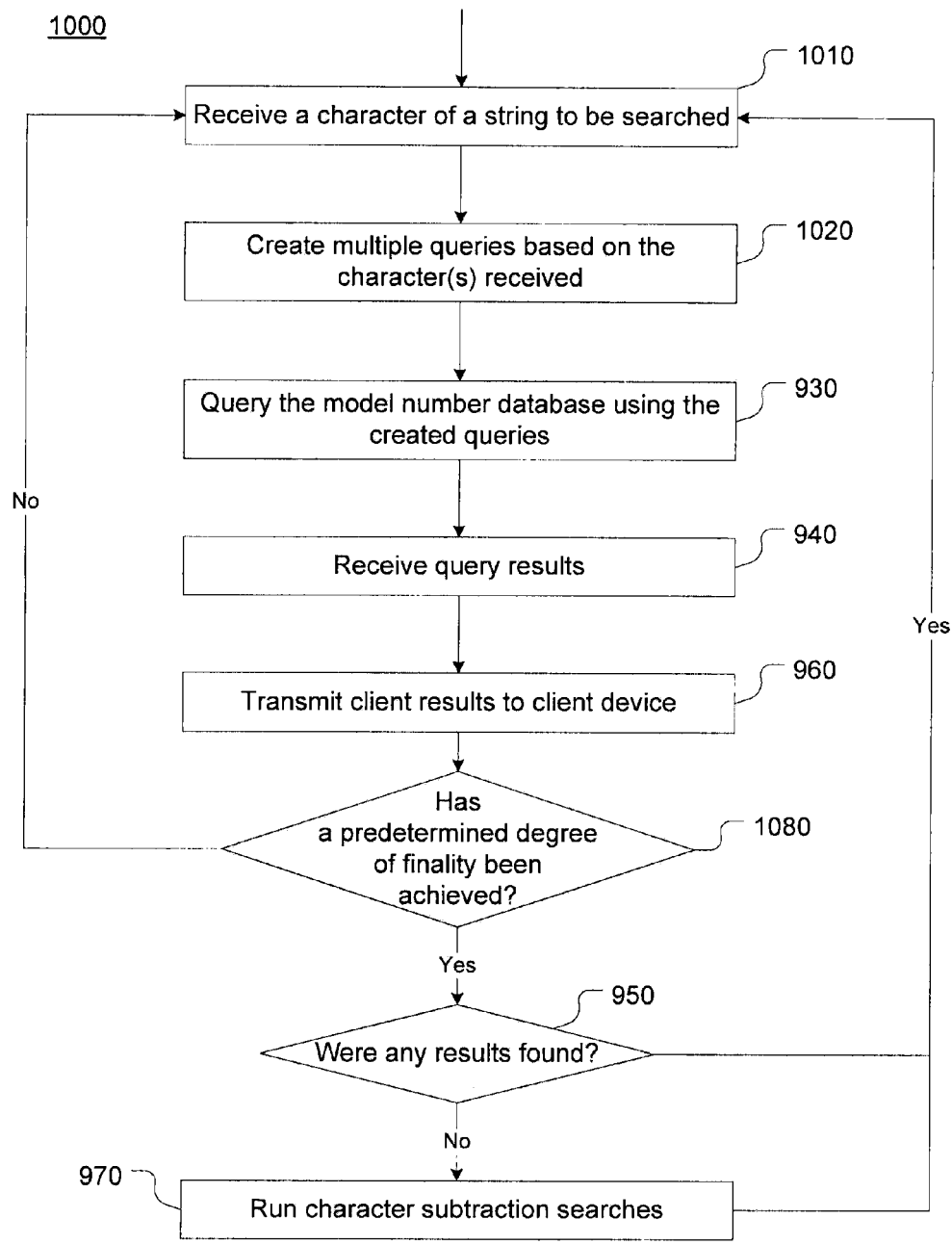
FIG. 10 illustrates a flowchart of an alternative processes for searching a product model number database, in accordance with an embodiment.

FIGS. 9 and 10 illustrate flowcharts of alternative processes 900 and 1000, respectively, for searching a product model number database. As will become apparent from the following discussion, the primary difference between process 900 and process 1000 is that process 900 submits one set of search queries (including a partial match query) for a given search string, whereas process 1000 resubmits search queries each time a new character of a search string is received.

Figure 11:
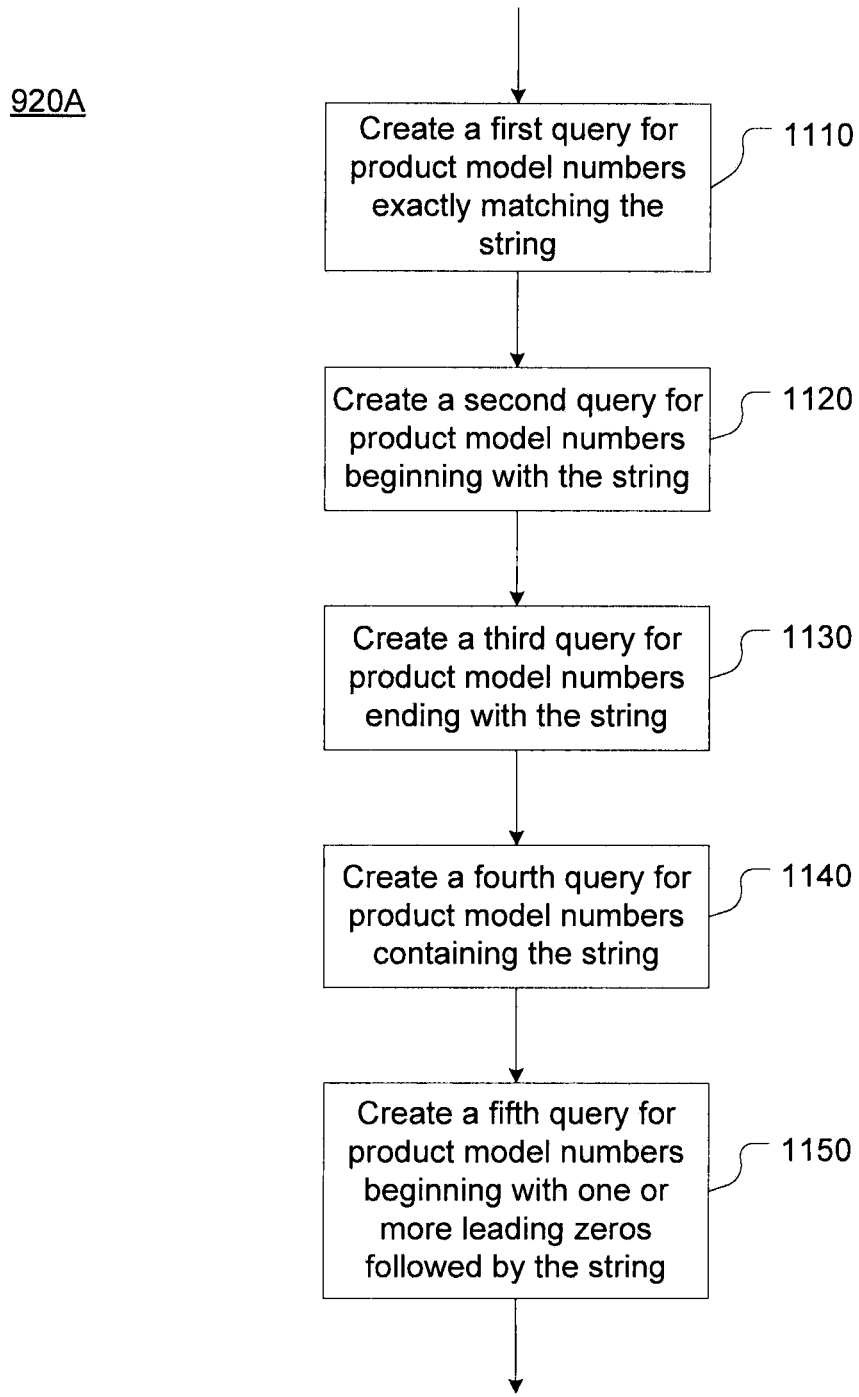
FIG. 11 illustrates an example process for creating multiple queries based upon a search string, in accordance with an embodiment.

Process 900 may begin at block 310, in which server system 220 receives a search string. The search string may comprise one or more characters, including letters, numbers and/or other typographical characters. Similarly, process 1000 may begin at block 1010, in which server system 220 receives an individual character of the search string. At steps 920 and 1020, the server system 220 creates multiple queries based upon the search string or character(s) received. It should be appreciated that this may be achieved in a number of ways. For example, FIG. 11 illustrates an example process 920A for creating multiple queries based upon a search string, in accordance with an embodiment of the present invention. While FIG. 11 depicts a number of steps in sequence, it should be appreciated that that they may also be performed in parallel. As shown, process 920A begins at block 1110, where server system 220 creates a first query for product model numbers exactly matching the string. Server system 220 then creates queries for product model numbers beginning with the string (block 1120), ending with the string (block 1130), and containing the string (1140). Server 220 system may also create a fifth query for product model numbers beginning with one or more leading zeros followed by the string (e.g. so that a search for "12345" captures the search result "0012345"). Step 1020 of process 1000 may be implemented in a manner similar to process 920A, wherein the characters currently received may constitute the search string upon which the first, second, third, fourth and fifth queries are based.

Referring again to FIGS. 9 and 10, processes 900 and 1000 each continue at block 930, where server system 220 queries the model number database 225 using the created queries (e.g., those created in steps 920 or 1020 or process 920A). At block 930, the server system 220 receives the query results, which, in the case where there are no matching product model numbers, may be a NULL set.

In some embodiments, processes 900 and 1000 may then proceed to step 960, where the server system 220 transmits the query results to the client device 210. However, as mentioned above, there may be some instances in which no results are returned, the most significant of which is when the user submits a search string that includes a prefix or suffix that is not appended to the corresponding model number in the database 225. Thus, some embodiments may include functionality for conducting a "partial match" search, so that the appropriate model number is returned even when the user enters an extra prefix and/or suffix.

Depending on whether the server system 220 is set up to search only once, such as in process 900, or to search dynamically, such as in process 1000, the partial match search may be performed at different points during the respective processes. For example, since search results are preferably transmitted to the client device only once in process 900, it is desirable to perform the partial match search before the results are transmitted in block 960. On the other hand, since the search results are dynamically updated in process 1000, it may be more desirable to perform the partial match search after some degree of finality has been achieved (e.g. the user has not entered any additional characters for a certain amount of time, the user has clicked "Search," etc.) so as to avoid unnecessary processing and network overhead. Thus, in process 900, after block 940, a determination is made as to whether any results were found (block 950)—that is, whether the results returned were not an empty or NULL set. If results were found from the initial searches, then process 900 simply proceeds to block 960, where the results are transmitted to the client device 210. If results were not found, then server system 220 performs character subtraction, or partial match, searches (block 970), discussed in greater detail below.

Alternatively, in process 1000, after block 960, a determination is made as to whether predetermined degree of finality has been achieved in the search (block 1080). In one embodiment, this may occur when the user has not entered any additional characters for a certain amount of time. In another embodiment, this may occur when the user has clicked "Search" or the like. It will be appreciated that other methods of establishing finality may also be possible. If the degree of finality has not been achieved, then process 1000 returns to block 1010 and continues to receive characters. If the degree of finality has been achieved, then a determination is made as to whether any results were found (block 950). If results were found from the initial searches, then process 1000 returns to block 1010. If results were not found, then server system 220 performs the character subtraction, or partial match, searches (block 970).

Figure 12:
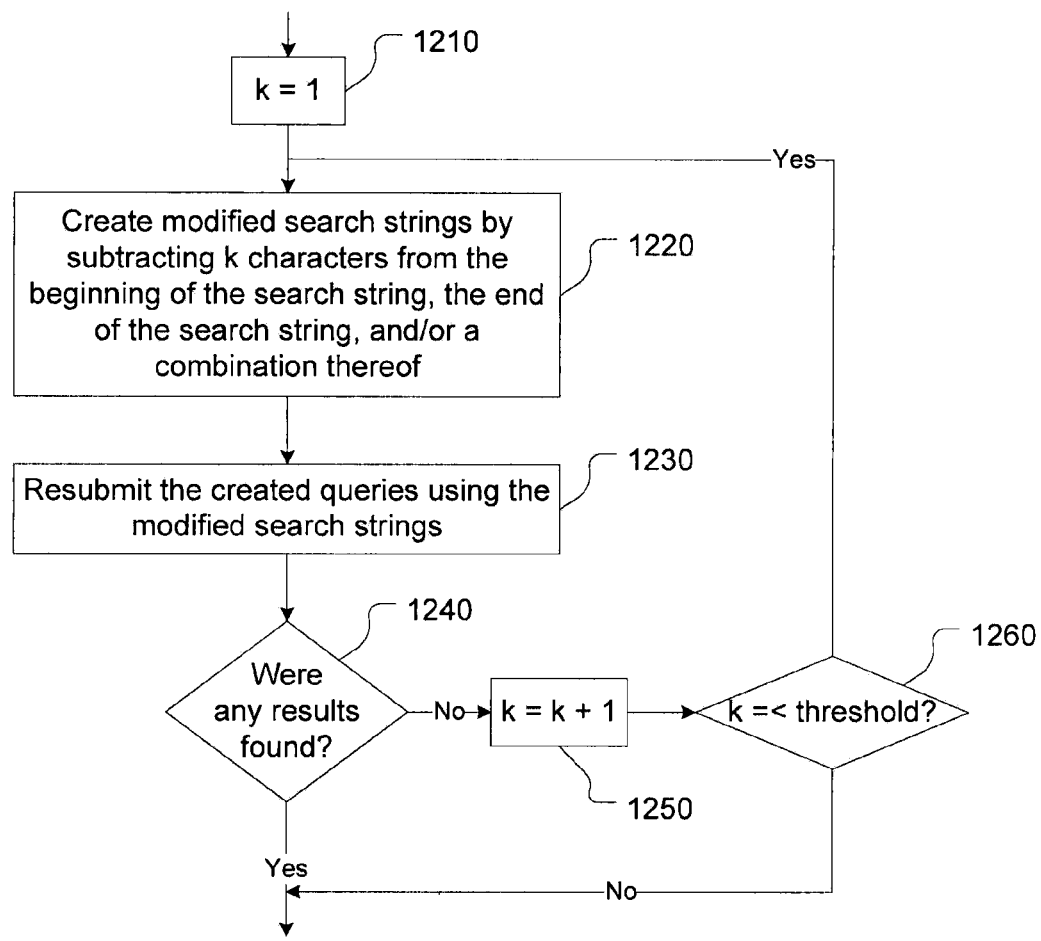
FIG. 12 is a flowchart of a process for performing a character subtraction, or a partial match, search, in accordance with an embodiment.

It will be appreciated that character subtraction searches 970 may be performed in a number of ways. For example, FIG. 12 is a flowchart of a process 970A for performing a character subtraction search, in accordance with an embodiment. Process 970A begins at block 1210, where a counter variable k is initially set to 1. Next, server system 220 creates modified search strings by "subtracting" k characters from the beginning of the search string, the end of the search string, or a combination thereof. By way of example, Table 1 below shows sample modified search strings that may be created for the hypothetical search string "123456789" for values of k of 1 through 5.

TABLE 1

Modified Search Strings for "123456789"

| k = | Modified Search Strings | | | | |
|---|---|---|---|---|---|
| 1 | 12345678 | 23456789 | | | |
| 2 | 1234567 | 2345678 | 3456789 | | |
| 3 | 123456 | 234567 | 345678 | 456789 | |
| 4 | 12345 | 23456 | 34567 | 45678 | 56789 |
| 5 | 1234 | 2345 | 3456 | 4567 | 5678 | 6789 |

Once the server system 220 has created the modified search strings for the current value of k (e.g. "12345678" and "23456789" for k=1), the server system 220 will resubmit the created queries using the modified search strings (block 1230). At block 1240, a determination is made as to whether any results were found using the current set of modified search strings. If yes, then character subtraction routine 970A exits. If not, then the server system 220 increments k (block 1250) and checks whether k is less than or equal to a predetermined threshold value (block 1260). If it is, then process 970A returns to block 1220. If not, then the routine exits. The purpose of the threshold value is to avoid performing meaningless searches. For example, a search for "56" responsive to a user's input of "123456789" is likely to have little value. The threshold value may accordingly be either a fixed number (e.g. 3) or one that varies based upon the size of the original search string (e.g. 25% of the string length).

Thus, various embodiments of the present invention perform simultaneous model number searches responsive to a single search string that try to anticipate and see around common model number inconsistencies. This helps improve the probability of finding a match given the variations and complexities of model numbers.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-readable medium embodied in a non-transient, physical memory device having stored thereon computer executable instructions for searching a product model number database comprising a plurality of product model numbers, the instructions performing steps comprising:
   receiving a string to be searched in the product model number database from a client device;
   creating multiple queries based on the string;
   querying the model number database using the created queries;
   receiving query results from the model number database responsive to the created queries; and
   transmitting the query results to the client device.

2. The computer-readable medium as recited in claim 1, wherein at least two of the queries are selected from the group consisting of:
   a search for product model numbers beginning with the string;
   a search for product model numbers ending with the string;
   a search for product model numbers containing the string; or
   a search for product model numbers beginning with one or more leading zeroes followed by the string.

3. The computer-readable medium as recited in claim 1, wherein creating multiple queries based on the string comprises:
   creating a first query comprising a search for product model numbers beginning with the string;
   creating a second query comprising a search for product model numbers ending with the string; and
   creating a third query comprising a search for product model numbers containing the string.

4. The computer-readable medium as recited in claim 3, wherein creating multiple queries based on the string further comprises:
   creating a fourth query comprising a search for product model numbers beginning with one or more leading zeroes followed by the string.

5. The computer-readable medium as recited in claim 1, wherein receiving the string to be searched comprises successively receiving each character of the string.

6. The computer-readable medium as recited in claim 5 further comprising repeating said creating, querying, receiving query results and transmitting steps each time a character is received.

7. The computer-readable medium as recited in claim 1, further comprising:
   creating a modified search string by removing one or more characters from the beginning of the string, the end of the string, or a combination thereof;
   creating multiple modified queries based on the modified search string;
   querying the model number database using the modified queries; and
   receiving query results from the model number database responsive to the modified queries.

8. The computer-readable medium as recited in claim 1, wherein the query results comprise product information concerning at least one product model responsive to the created queries.

9. The computer-readable medium as recited in claim 8, wherein the product information comprises a product model number, a brand name, a price and a product image associated with the at least one product model responsive to the created queries.

10. A computer-readable medium embodied in a non-transient, physical memory device having stored thereon computer executable instructions for searching a product model number database comprising a plurality of product model numbers, the instructions performing steps comprising:

receiving a string to be searched in the product model number database from a client device;

creating multiple queries based on the string, at least two of the queries being selected from the group consisting of:
- a search for product model numbers beginning with the string;
- a search for product model numbers ending with the string;
- a search for product model numbers containing the string; or
- a search for product model numbers beginning with one or more leading zeroes followed by the string;

querying the model number database using the created queries;

receiving query results from the model number database responsive to the created queries; and transmitting the query results to the client device.

11. The computer-readable medium as recited in claim 10, wherein at least three of the queries are selected from the group consisting of:
- a search for product model numbers beginning with the string;
- a search for product model numbers ending with the string;
- a search for product model numbers containing the string; or
- a search for product model numbers beginning with one or more leading zeroes followed by the string.

12. The computer-readable medium as recited in claim 10, wherein at least four of the queries are selected from the group consisting of:
- a search for product model numbers beginning with the string;
- a search for product model numbers ending with the string;
- a search for product model numbers containing the string; or
- a search for product model numbers beginning with one or more leading zeroes followed by the string.

13. The computer-readable medium as recited in claim 10, wherein receiving the string to be searched comprises successively receiving each character of the string.

14. The computer-readable medium as recited in claim 13 further comprising repeating said creating, querying, receiving query results and transmitting steps each time a character is received.

15. The computer-readable medium as recited in claim 10, further comprising:
creating a modified search string by removing one or more characters from the beginning of the string, the end of the string, or a combination thereof;
creating multiple modified queries based on the modified search string;
querying the model number database using the modified queries; and
receiving query results from the model number database responsive to the modified queries.

16. A computer-readable medium embodied in a non-transient, physical memory device having stored thereon computer executable instructions for searching a product model number database comprising a plurality of product model numbers, the instructions performing steps comprising:

receiving a string to be searched in the product model number database from a client device;

creating a first query comprising a search for product model numbers beginning with the string;

creating a second query comprising a search for product model numbers ending with the string;

creating a third query comprising a search for product model numbers containing the string;

creating a fourth query comprising a search for product model numbers beginning with one or more leading zeroes followed by the string;

querying the model number database using the first, second, third and fourth queries;

receiving query results from the model number database responsive to the first, second, third and fourth queries; and transmitting the query results to the client device.

17. The computer-readable medium as recited in claim 16, wherein receiving the string to be searched comprises successively receiving each character of the string.

18. The computer-readable medium as recited in claim 17 further comprising repeating each of said creating steps, said querying step, said receiving query results step and said transmitting step each time a character is received.

19. The computer-readable medium as recited in claim 16, further comprising:
creating a modified search string by removing one or more characters from the beginning of the string, the end of the string, or a combination thereof;
creating multiple modified queries based on the modified search string;
querying the model number database using the modified queries; and
receiving query results from the model number database responsive to the modified queries.

* * * * *